UNITED STATES PATENT OFFICE.

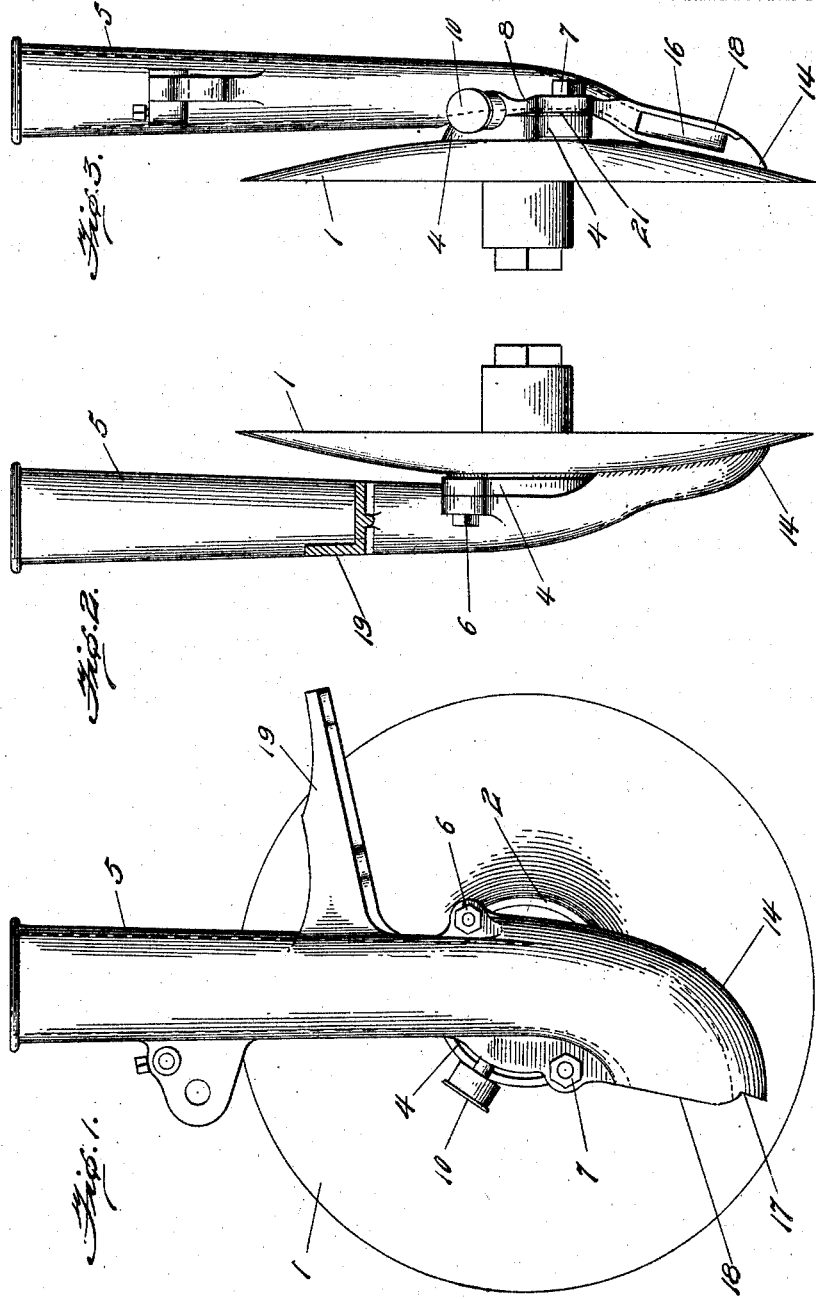

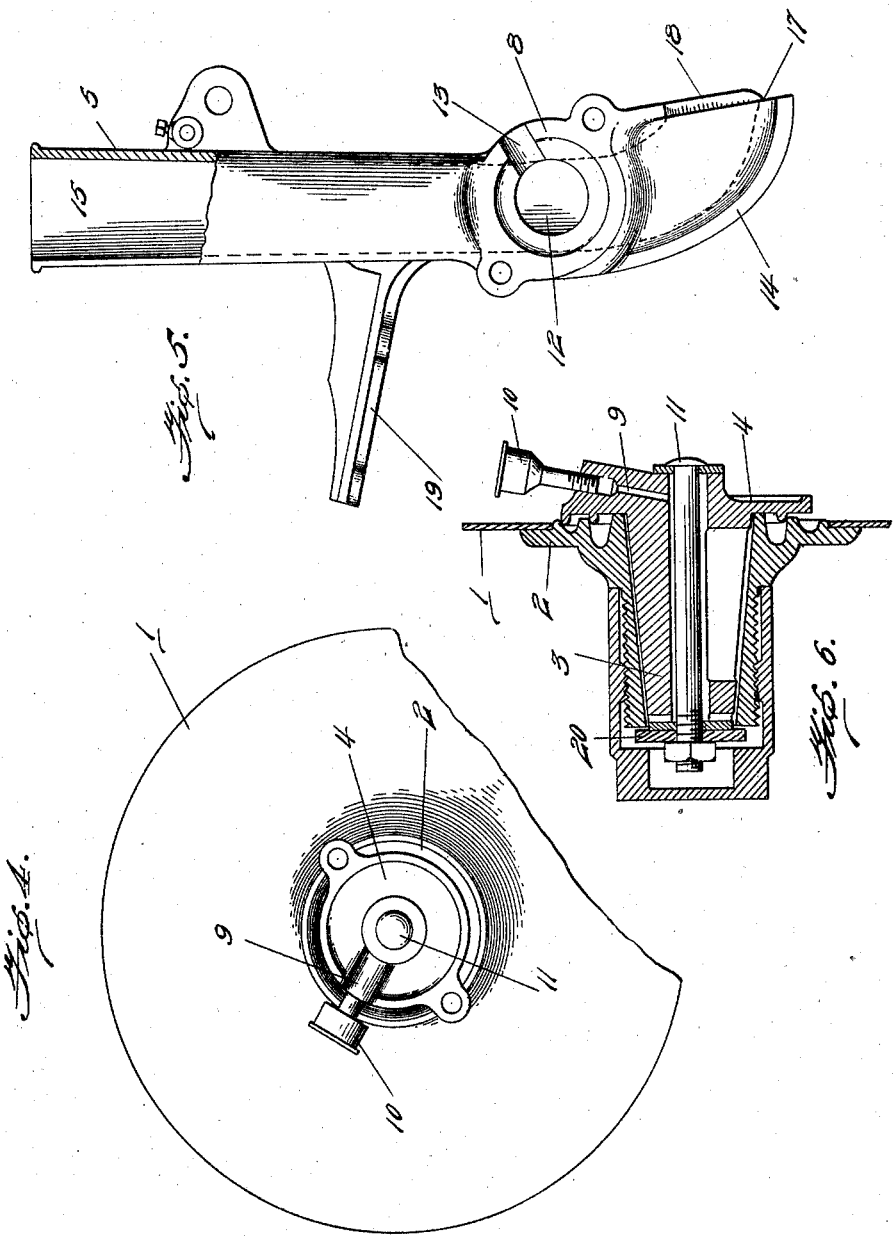

CHARLES B. DEMPSTER AND WILLIAM ELLIOTT, OF BEATRICE, NEBRASKA, ASSIGNORS TO DEMPSTER MILL MANUFACTURING COMPANY, OF BEATRICE, NEBRASKA.

GRAIN-DRILL BOOT.

967,341.        Specification of Letters Patent.      Patented Aug. 16, 1910.

Application filed February 27, 1908. Serial No. 418,117.

*To all whom it may concern:*

Be it known that we, CHARLES B. DEMPSTER and WILLIAM ELLIOTT, citizens of the United States, residing at Beatrice, in the county of Gage and State of Nebraska, have invented certain new and useful Improvements in Grain-Drill Boots, of which the following is a specification.

Our invention relates to improvements in grain drills of the type generally known as disk drills, in which the seed furrows are opened by gangs of rotating disks carried by the machine, the seed being carried downward through suitably disposed conduits and deposited in the furrows made by the disks.

Our present invention relates to improvements in the construction of the conduits or boots, and their adjustment with reference to the disks.

A great variety of grain-boots has heretofore been in use, many of them terminating too far above the furrow, or having their lower portion open on the side toward the disk, so as to scatter the seed against the side of the revolving disk, thus resulting in much of the seed being carried backward and upward, and being lost by failure to get into the furrow, or be sufficiently covered. In other cases the boots or conduits have been made to discharge too far to the rear of the point where the furrows are formed, so that the furrows become partially closed up, by the falling in of the soil, before the seed is deposited in them; thus also necessitating the formation of deeper furrows than would otherwise be necessary. Under our construction and adjustment the boot is entirely closed on the side toward the disk, as well as on the outer side, and extends downward to a point immediately over and adjacent to the furrow, so that the seed is deposited in or near the bottom of the furrow as soon as the furrow is formed, and without putting the furrow openers into the ground as deep as would be required with other boots depositing the seed at the same depth. Our boots are also so formed, and so adjusted with reference to the disks, that they coöperate with the disks in opening the furrows, and also act as cleaners or scrapers for the disks. We also provide means for adjusting the disks toward or away from the coöperating edges of the boots.

In the accompanying drawings Figure 1 is a side elevation of a grain-boot and cutting disk constructed and adjusted according to our invention. Fig. 2 is a front or edgewise view of the same, with a portion of the draft-arm of the boot broken away. Fig. 3 is a rear edgewise elevation of the boot and disk. Fig. 4 is a side elevation of the convex face of the disk, with the boot removed, showing also the inner end or head of the spindle on which the disk rotates. Fig. 5 is an elevation of the inner side of the boot detached from the disk. Fig. 6 is a vertical section through the disk-hub and spindle.

The cutting disk 1 is mounted centrally on a hub 2, which rotates on a conical spindle 3. The inner end or head of said spindle carries integrally a flanged head-plate 4, which plate is rigidly secured to the boot 5 by bolts 6 7, passing through said flange 4 and a corresponding flange 8 on the boot. An oil-tube 9, provided with a cap 10, passes radially through the head-plate 4, to provide for oiling the disk bearing. The bolt 11, in connection with a washer 20, holds the hub on the spindle. The traction arms 19 provide for drawing the boots and disks forward when the machine is in operation.

The tubular grain-boots 5 depend from the machine in a substantially vertical position, approximately on the center line of the disks, and sustain and carry the disks 1, through the connection of the boots with the flanged spindle-heads 4. The inner wall of each boot toward the disk, as shown in Fig. 5, is flattened and provided with a flange 8 where it fits against the head-plate 4 of the spindle. An opening 12 in said wall is provided, to receive the head of the bolt 11; also a radial groove 13, to permit the passage of the oil-tube. The lower end of the boot extends downward in a substantially vertical direction, nearly to the lower margin of the disk, curving inwardly and also slightly rearwardly, as shown in Figs. 1, 2 and 3, and conforming closely to the convex face of the disk. The lower front edge of the boot, where it bears against the disk, is formed with a dull edge 14, which assists in opening the furrow. Said edge also acts as a scraper to clear the face of the disk from dirt and rubbish. The closed grain conduit 15 passes down through the boot vertically afterward curving slightly rearwardly, and ending in the discharge opening 16, at the extreme lower end of the boot, in close proximity to the edge 14 of the boot, and the lower edge of the disk.

In operation it will be seen that as the machine advances the furrow will be opened, primarily by the action of the cutting-disk 1, and will be held open for an instant by the joint action of the edge 14 of the boot; and before the furrow can close the seed will fall into it from the discharge opening 16. The lower rear edge of the boot is also cut away or notched at 17, immediately below the discharge opening, and the outer wall of the conduit, at 18, adjacent to said opening, is extended rearwardly beyond the inner wall; the result of which construction is that the seed drops vertically from the discharge opening and directly into the bottom of the furrow, and while it is doing so the soil is held back and prevented from caving in by the extension 18. At the same time caving on the other side of the furrow is prevented by the presence of the disk.

It is to be understood that our present device is entirely distinct from the class of furrow-openers known as the "shield" type, in which the boot and conduit practically terminate at a point about level with, or even above, the center of the disk; but in which an extension or prolongation of the outer wall of the boot, generally called a "shield", is provided; said shield extending down, for a greater or less distance, toward the furrow; so that when the seed reaches the end of the conduit it drops from that point to the ground, being however usually deflected inwardly toward the disk by the operation of said shield; and a part of the seed, though in many cases only a small part, is deposited in the furrow. Our boot is entirely closed on both sides, and the conduit within it is continuous and without lateral openings, from its upper end to the discharge-opening at the bottom, within or in immediate proximity to the furrow; so that there is no possibility of any of the seed being scattered or lost.

The face of the disk may be adjusted toward or away from the scraping edge 14 of the boot by proper manipulation of the bolts 6 7. For example by slightly loosening or extending either of said bolts, and interposing a washer, as 21, mounted on the bolt, as shown in Fig. 3, or other spacing means, between the flanges 4 and 8, the disk may be thrown nearer to the boot or farther away from it. As shown in Fig. 3 the washer being on the rear bolt 7, its presence will operate to tilt the spindle 3 slightly out of normal, and throw the lower portion of the disk nearer to the edge 14 of the boot. With the washer on bolt 6, Figs. 1 and 2, in a similar position, the disk would be thrown away from the edge of the boot. The adjustment can thus be varied to take up wear, to meet different conditions of soil, etc.

Having described our invention, we claim as new and desire to secure by Letters Patent:

1. In a disk grain drill, a tubular seed-boot, a detachable and adjustable spindle carried by said boot, a disk rotatably mounted on said spindle, said boot passing downward to the furrow line along the center vertical line of the disk, afterward bending rearwardly and having its lower front margin formed with an edge conforming to the convex face of the disk, a closed conduit extending continuously through said boot, and having a rearward discharge at the lower extremity of the boot, adjacent to the coöperating furrow-opening edges of the boot and disk, substantially as set forth.

2. In a disk grain drill, a vertically disposed tubular seed-boot, a spindle carried by said boot, a disk rotatably mounted on the spindle, said boot extending downward to the furrow line, along the central vertical line of the disk, the lower front margin of the boot being formed with an edge bearing against the face of the disk, a seed-conduit continuously extending through said boot and having a rearward discharge opening at the lower extremity of the boot and adjacent to the coöperating edges of the disk and boot, the outer wall of said conduit at the discharge opening being extended rearwardly beyond said discharge opening to form a shield, to prevent caving in of the furrow while the seed is being deposited, substantially as set forth.

3. In a disk drill, the combination of a substantially vertical tubular seed-boot, a spindle carried by the boot, a cutting disk rotatably mounted on the spindle, the lower front margin of the boot having an edge conforming to and adapted to bear against the face of the disk, said spindle having a flanged head engaging a corresponding flanged seat on the adjacent side of the boot, front and rear bolts connecting said flanges on opposite sides of the axis of the spindle, and spacing means carried by one of said bolts and interposed between said flanges, for throwing the disk toward or away from the edge of the boot.

In testimony whereof we affix our signatures in presence of two witnesses.

CHARLES B. DEMPSTER.
WILLIAM ELLIOTT.

Witnesses:
R. H. YALE,
H. L. DEMPSTER.